United States Patent
Davis

(10) Patent No.: US 9,526,385 B2
(45) Date of Patent: Dec. 27, 2016

(54) RIDABLE TOILET TRAINING DEVICE

(71) Applicant: Lorna-Mae Davis, Maplewood, NJ (US)

(72) Inventor: Lorna-Mae Davis, Maplewood, NJ (US)

( * ) Notice: Subject to any disclaimer, the term of this patent is extended or adjusted under 35 U.S.C. 154(b) by 198 days.

(21) Appl. No.: 14/337,723

(22) Filed: Jul. 22, 2014

(65) Prior Publication Data
US 2016/0022099 A1    Jan. 28, 2016

(51) Int. Cl.
*A47K 11/04*    (2006.01)
*B62K 9/02*    (2006.01)

(52) U.S. Cl.
CPC  *A47K 11/04* (2013.01); *B62K 9/02* (2013.01)

(58) Field of Classification Search
CPC ........................................... A47K 11/04
USPC ..................... 4/483, 479, 449, 902
See application file for complete search history.

(56) References Cited

U.S. PATENT DOCUMENTS

| | | | |
|---|---|---|---|
| D242,456 S * | 11/1976 | Willis | D23/297 |
| D310,118 S * | 8/1990 | Lemon | D23/297 |
| D320,845 S * | 10/1991 | Lambdin | D23/297 |
| D321,046 S | 10/1991 | Lambdin | |
| 5,083,325 A | 1/1992 | Vitullo | |
| D337,973 S | 8/1993 | Mariol | |
| 5,509,149 A * | 4/1996 | Lynch | G09B 19/0076 297/172 |
| 5,575,021 A | 11/1996 | Harris | |
| D379,407 S | 5/1997 | Liu | |
| 5,734,998 A | 4/1998 | Simmons | |

* cited by examiner

*Primary Examiner* — Huyen Le

(57) ABSTRACT

A ridable toilet training device teaches young children to use a toilet. The device includes a frame having a top wall, a bottom wall, a front wall, a rear wall and a pair of lateral walls. Each of the front and rear walls and the pair of lateral walls is attached to and extends between the top and bottom walls. An interior of the frame defines a receptacle. A plurality of wheels is rotatably coupled to the bottom wall. The plurality of wheels includes a front wheel assembly positioned near the front wall and a rear wheel assembly positioned near the rear wall. A hole is positioned in the top wall and extends around the receptacle. A bowl is positionable in the receptacle. The bowl has a lower wall and a perimeter wall coupled to and extending upwardly from the lower wall wherein the bowl receives waste products therein.

15 Claims, 4 Drawing Sheets

RIDABLE TOILET TRAINING DEVICE

BACKGROUND OF THE DISCLOSURE

Field of the Disclosure

The disclosure relates to toilet training devices and more particularly pertains to a new toilet training device for teaching young children to use a toilet.

SUMMARY OF THE DISCLOSURE

An embodiment of the disclosure meets the needs presented above by generally comprising a frame having a top wall, a bottom wall, a front wall, a rear wall and a pair of lateral walls. Each of the front and rear walls and the pair of lateral walls is attached to and extends between the top and bottom walls. An interior of the frame defines a receptacle. A plurality of wheels is rotatably coupled to the bottom wall. The plurality of wheels includes a front wheel assembly positioned near the front wall and a rear wheel assembly positioned near the rear wall. A hole is positioned in the top wall and extends around the receptacle. A bowl is positionable in the receptacle. The bowl has a lower wall and a perimeter wall coupled to and extending upwardly from the lower wall wherein the bowl receives waste products therein.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
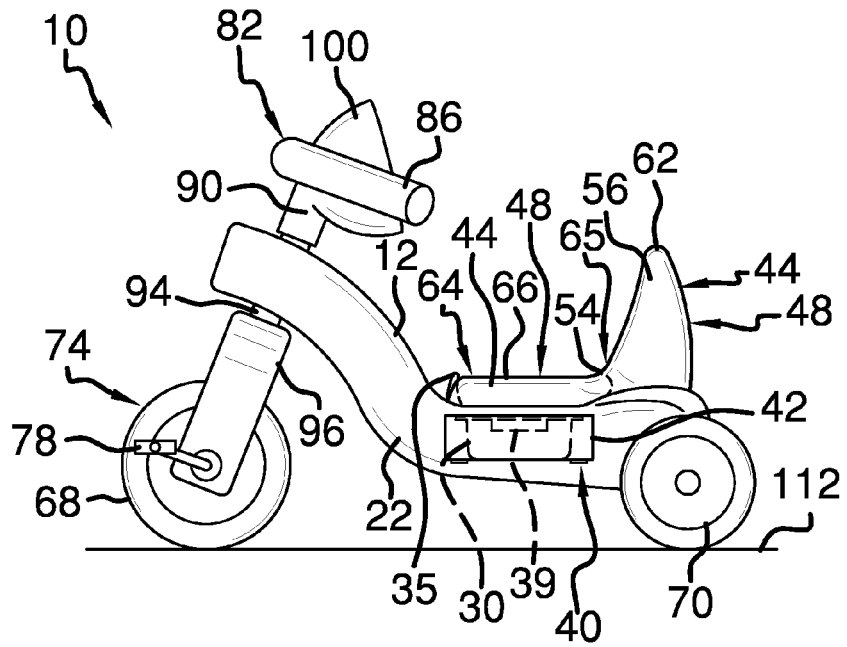
FIG. 1 is a side view of a ridable toilet training device according to an embodiment of the disclosure showing the lid in a closed position.
Figure 2:
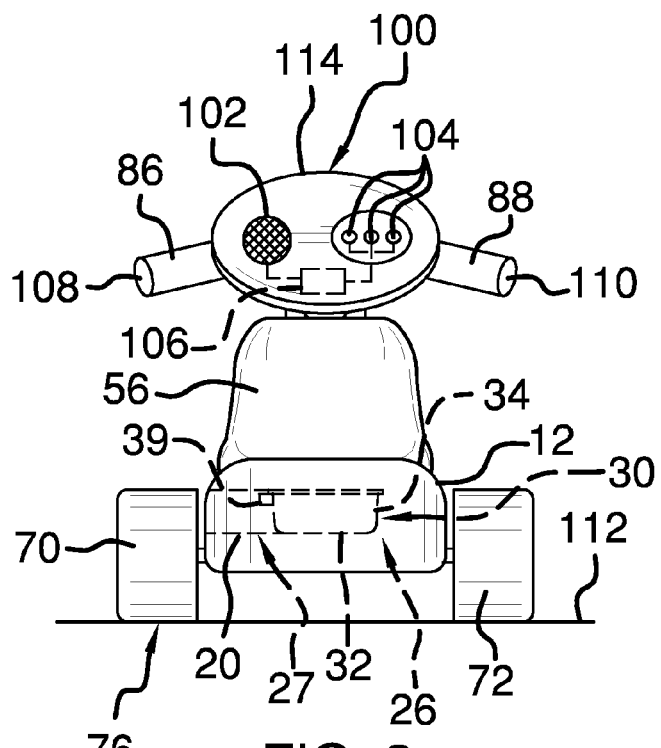
FIG. 2 is a back view of an embodiment of the disclosure.
Figure 3:
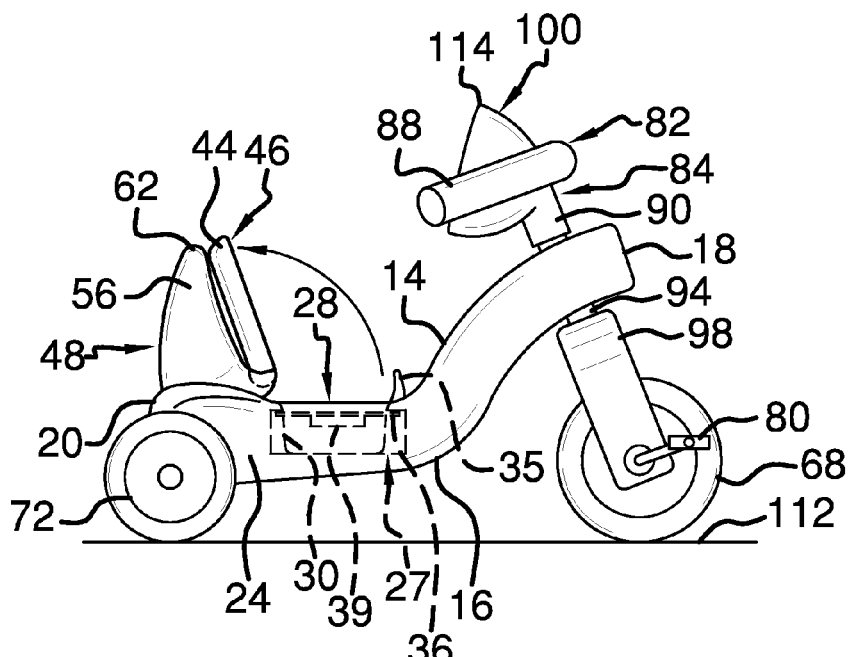
FIG. 3 is a side view of an embodiment of the disclosure showing the lid in an open position.
Figure 4:
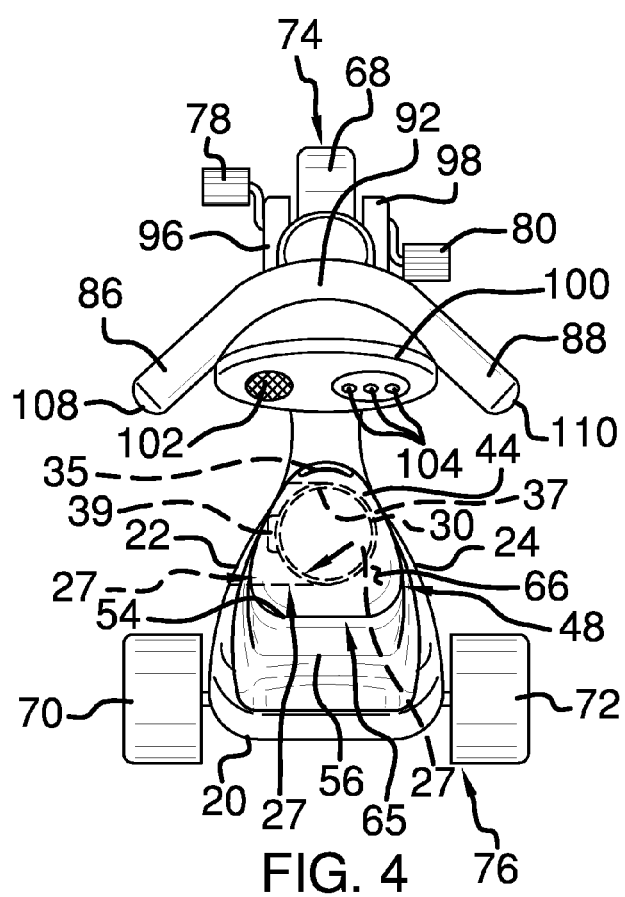
FIG. 4 is a top view of an embodiment of the disclosure.
Figure 5:
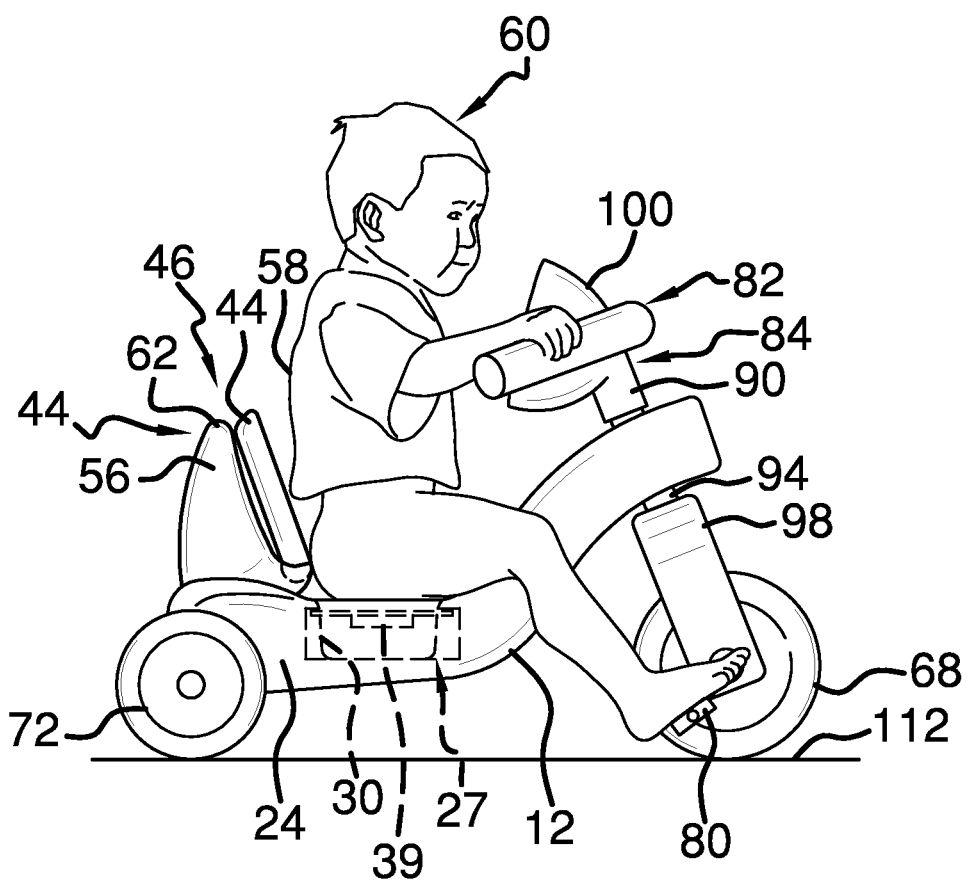
FIG. 5 is an in-use side view of an embodiment of the disclosure.
Figure 6:
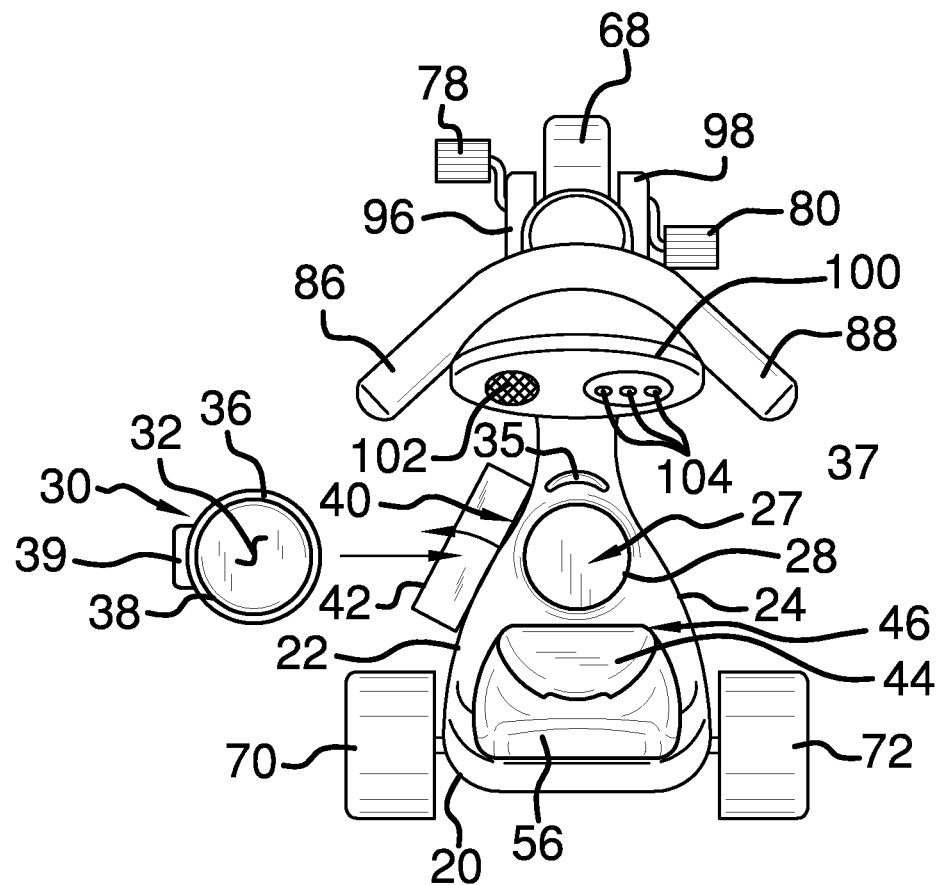
FIG. 6 is a top view of an embodiment of the disclosure showing the bowl removed from the frame.

With reference now to the drawings, and in particular to FIGS. 1 through 6 thereof, a new toilet training device embodying the principles and concepts of an embodiment of the disclosure and generally designated by the reference numeral 10 will be described.

As best illustrated in FIGS. 1 through 6, the ridable toilet training device 10 generally comprises a frame 12 having a top wall 14, a bottom wall 16, a front wall 18, a rear wall 20 and a pair of lateral walls 22, 24. Each of the front 18 and rear 20 walls and the pair of lateral walls 22, 24 is attached to and extends between the top 14 and bottom 16 walls. The frame 12 is constructed from a rigid material, such as plastic, metal or the like, though plastic may be preferable to provide a lightweight device 10 that is easily movable by a user 60.

An interior 26 of the frame 12 defines a receptacle 27. A hole 28 is positioned in the top wall 14 and extends around the receptacle 27. A bowl 30 is positionable in the receptacle 27 and has a lower wall 32 and a perimeter wall 34 coupled to and extending upwardly from the lower wall 32 wherein the bowl 30 is configured to receive waste products from the user 60 therein, such as fecal matter and urine. The bowl 30 may include a lip 36 coupled to and coextensive with an upper edge 38 of the perimeter wall 34. The lip 36 may project outwardly from the upper edge 38. A shield 35 is attached to and extends upwardly from the frame 12 and is positioned adjacent to a front section 37 of the hole 28 such that the shield 35 is configured to direct urine into the receptacle 27, especially when the user 60 is of the male gender. A handle 39 is coupled to the bowl 30 and is graspable by the user 60 to facilitate moving the bowl 30 where needed.

An opening 40 is positioned in an associated one of the lateral walls 22, 24 and is aligned with the receptacle 27. The bowl 30 is positionable in and removable from the receptacle 27 through the opening 40. A door 42 is pivotally coupled to the associated lateral wall 22, 24 and is positionable to cover the opening 40.

A lid 44 is pivotally coupled to the frame 12 and is positionable in an open position 46 exposing the hole 28 or in a closed position 48 covering the hole 28. The lid 44 defines a seat bottom 64 for the user to sit upon when the lid 44 is positioned in the closed position 48. A seat back 56 is coupled to and extends upwardly from a rear end 54 of the seat bottom 64 for a back 58 of the user 60 to rest upon. The seat back 56 may taper inwardly from a juncture 65 of the lid 44 and the seat back 56 to a top edge 62 of the seat back 56. A top side 66 of the seat bottom 64 may be planar.

A plurality of wheels 68, 70, 72 is rotatably coupled to the bottom wall 16 of the frame 12. The plurality of wheels 68, 70, 72 includes a front wheel assembly 74 positioned near the front wall 18 and a rear wheel assembly 76 positioned near the rear wall 20. A pair of pedals 78, 80 is mechanically coupled to the front wheel assembly 74 in a generally conventional manner such that rotation of the pedals 78, 80 causes the wheel 68 of the front wheel assembly 74 to rotate. A distance from the front wheel assembly 74 to the rear wheel assembly 76 may be between approximately 50.0 cm and 70.0 cm.

A steering mechanism 82 is coupled to the frame 12 and is mechanically coupled to the front wheel assembly 74. The steering mechanism 82 may comprise a handlebar assembly 84 attached to the top wall 14 near the front wall 18 of the frame 12. The handlebar assembly 84 includes a first handlebar 86 and a second handlebar 88 each pivotally coupled to the front wheel assembly 74 such that movement of the handlebar assembly 84 urges the front wheel assembly 74 to move in a same direction as the handlebar assembly 84. The handlebar assembly 84 further includes a stem 90 attached to and extending downwardly from a juncture 92 of the first 86 and second 88 handlebars. A steer column 94 is provided and extends through the frame 12. The stem 90 may extend around and attach to the steer column 94. A pair of front forks 96, 98 is attached to the steer column 94 and the front wheel assembly 74 in a generally conventional manner to secure the front wheel assembly 74 to the frame 12. A distance between outer ends 108, 110 of the handlebar assembly 84 may be between approximately 32.0 cm and 45.0 cm.

An entertainment assembly 100 is coupled to the steering mechanism 82. A sound emitter 102, such as a horn or a speaker, is coupled to the entertainment assembly 100. One or more light emitters 104 are coupled to the entertainment assembly 100. The sound emitter 102 and each light emitter 104 are electrically coupled to a power source 106. The power source 106 may include at least one rechargeable battery. A height of the device 10 may measure between approximately 40.0 cm and 52.0 cm extending from a ground surface 112 to a top 114 of the control panel 100.

In use, the device 10 is ridden by a user 60 for entertainment in a generally conventional manner. However, the user 60 can also use the device 10 for potty training by positioning the bowl 30 in the receptacle 27 through the opening 40. When the user needs to defecate or urinate, the lid 44 is pivoted to the open position 46 to expose the hole 28. The user then defecates and/or urinates into the bowl 30 as needed. The bowl 30 can be removed from the receptacle 27 through the opening 40 to dispose of the waste matter. The receptacle 27 can be also be used instead for storage of toys or other small objects as desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A ridable toilet training device comprising:
 a frame having a top wall, a bottom wall, a front wall, a rear wall and a pair of lateral walls, each of said front and rear walls and said pair of lateral walls being attached to and extending between said top and bottom walls, an interior of said frame defining a receptacle;
 a plurality of wheels rotatably coupled to said bottom wall of said frame, said plurality of wheels including a front wheel assembly positioned near said front wall and a rear wheel assembly positioned near said rear wall;
 a hole positioned in said top wall extending around said receptacle;
 a bowl positionable in said receptacle, said bowl having a lower wall and a perimeter wall coupled to and extending upwardly from said lower wall wherein said bowl is configured to receive waste products therein; and
 a pair of pedals mechanically coupled to said front wheel assembly such that rotation of said pedals causes said wheel of said front wheel assembly to rotate.

2. The device of claim 1, further comprising a lid pivotally coupled to said frame, said lid being positionable in an open position exposing said hole and in a closed position covering said hole, said lid defining a seat bottom when said lid is in the closed position.

3. The device of claim 2, further comprising a seat back coupled to and extending upwardly from a rear end of said seat bottom.

4. The device of claim 3, further comprising a top side of said seat bottom being planar.

5. The device of claim 3, further comprising said seat back tapering inwardly from a juncture of said lid and said seat back to a top edge of said seat back.

6. The device of claim 1, further comprising an opening positioned in an associated one of said lateral walls and being aligned with said receptacle, said bowl being positionable in and removable from said receptacle through said opening.

7. The device of claim 6, further comprising a door pivotally coupled to said associated lateral wall, said door being positionable to cover said opening.

8. The device of claim 1, further comprising a steering mechanism coupled to said frame and being mechanically coupled to said front wheel assembly.

9. The device of claim 8, further comprising an entertainment assembly coupled to said steering mechanism, a sound emitter being coupled to said entertainment assembly.

10. The device of claim 8, further comprising an entertainment assembly coupled to said steering mechanism, a light emitter being coupled to said entertainment assembly.

11. The device of claim 8, further comprising wherein said steering mechanism comprises a handlebar assembly attached to said top wall near said front wall of said frame, said handlebar assembly including a first handlebar and a second handlebar each pivotally coupled to said front wheel assembly such that movement of said handlebar assembly urges said front wheel assembly to move in a same direction as said handlebar assembly.

12. The device of claim 1, further comprising wherein said bowl includes a lip coupled to and coextensive with an upper edge of said perimeter wall, said lip projecting outwardly from said upper edge.

13. The device of claim 1, further comprising a shield attached to and extending upwardly from said frame, said shield being positioned adjacent to a front section of said hole such that said shield is configured to direct urine into said receptacle.

14. The device of claim 1, further comprising a handle coupled to said bowl.

15. A ridable toilet training device comprising:
 a frame having a top wall, a bottom wall, a front wall, a rear wall and a pair of lateral walls, each of said front and rear walls and said pair of lateral walls being attached to and extending between said top and bottom walls, an interior of said frame defining a receptacle;
 a hole positioned in said top wall extending around said receptacle;
 a lid pivotally coupled to said frame, said lid being positionable in an open position exposing said hole and in a closed position covering said hole, said lid defining a seat bottom when said lid is positioned in the closed position, a top side of said seat bottom being planar;

a seat back coupled to and extending upwardly from a rear end of said seat bottom, said seat back tapering inwardly from a juncture of said lid and said seat back to a top edge of said seat back;

a bowl positionable in said receptacle, said bowl having a lower wall and a perimeter wall coupled to and extending upwardly from said lower wall wherein said bowl is configured to receive waste products therein, said bowl including a lip coupled to and coextensive with an upper edge of said perimeter wall, said lip projecting outwardly from said upper edge;

a handle coupled to said bowl;

a shield attached to and extending upwardly from said frame, said shield being positioned adjacent to a front section of said hole;

an opening positioned in an associated one of said lateral walls and being aligned with said receptacle, said bowl being positionable in and removable from said receptacle through said opening;

a door pivotally coupled to said associated lateral wall, said door being positionable to cover said opening;

a plurality of wheels rotatably coupled to said bottom wall of said frame, said plurality of wheels including a front wheel assembly positioned near said front wall and a rear wheel assembly positioned near said rear wall;

a pair of pedals mechanically coupled to said front wheel assembly such that rotation of said pedals causes said wheel of said front wheel assembly to rotate;

a steering mechanism coupled to said frame and being mechanically coupled to said front wheel assembly, said steering mechanism comprising a handlebar assembly attached to said top wall near said front wall of said frame, said handlebar assembly including a first handlebar and a second handlebar each pivotally coupled to said front wheel assembly such that movement of said handlebar assembly urges said front wheel assembly to move in a same direction as said handlebar assembly;

an entertainment assembly coupled to said steering mechanism;

a sound emitter being coupled to said entertainment assembly; and a light emitter being coupled to said entertainment assembly.

\* \* \* \* \*